United States Patent
Wang et al.

(10) Patent No.: US 9,380,593 B2
(45) Date of Patent: Jun. 28, 2016

(54) METHOD AND SYSTEM FOR ESTABLISHING BEARER SUPPORTING UPLINK SEMI-PERSISTENT SCHEDULING AND USER EQUIPMENT THEREOF

(71) Applicant: ZTE Corporation, Shenzhen, Guangdong (CN)

(72) Inventors: Xiaofeng Wang, Shenzhen (CN); Qian Han, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/424,117

(22) PCT Filed: Aug. 23, 2013

(86) PCT No.: PCT/CN2013/082229
§ 371 (c)(1),
(2) Date: Feb. 26, 2015

(87) PCT Pub. No.: WO2014/032551
PCT Pub. Date: Mar. 6, 2014

(65) Prior Publication Data
US 2015/0215953 A1 Jul. 30, 2015

(30) Foreign Application Priority Data

Aug. 27, 2012 (CN) .......................... 2012 1 0307708

(51) Int. Cl.
*H04W 72/04* (2009.01)
*H04W 72/08* (2009.01)
(Continued)

(52) U.S. Cl.
CPC ............ *H04W 72/087* (2013.01); *H04W 16/02* (2013.01); *H04W 28/0263* (2013.01);
(Continued)

(58) Field of Classification Search
None
See application file for complete search history.

(56) References Cited

U.S. PATENT DOCUMENTS

| | | | |
|---|---|---|---|
| 2011/0287738 A1 | 11/2011 | Peisa | |
| 2012/0069805 A1* | 3/2012 | Feuersanger | H04W 72/1284 370/329 |

(Continued)

FOREIGN PATENT DOCUMENTS

| | | |
|---|---|---|
| CN | 102014441 A | 4/2011 |
| CN | 102308616 A | 1/2012 |

(Continued)

OTHER PUBLICATIONS

International Search Report in international application No. PCT/CN2013/082229, mailed on Nov. 28, 2013.

(Continued)

*Primary Examiner* — Fan Ng
(74) *Attorney, Agent, or Firm* — Oppedahl Patent Law Firm LLC

(57) ABSTRACT

Disclosed are a method and system for establishing a bearer supporting uplink Semi-Persistent Scheduling (SPS) and a User Equipment (UE) thereof, and the method includes: an RRC entity of a UE parses an RRC connection reconfiguration message transmitted from an eNB to obtain logic channel configuration information, EPS bearer activation request information and RBID information, transmits the logic channel configuration information to an MAC entity of the UE and transmits the EPS bearer activation request information and the RBID information to an NAS of the UE; the MAC entity of the UE establishes an LC and an LCG between itself and an RLC entity according to the received logic channel configuration information, and establishes a mapping between the RBID and the LCG; the NAS of the UE establishes an EPS bearer between itself and an NAS of an EPC according to the received EPS bearer activation request information, and establishes correspondences between classifiers and LCs; and parses a QCI and the RBID from the EPS bearer activation request information, establishes a mapping between the parsed QCI and the received RBID, and transmits the mapping to the MAC entity. The present disclosure enables a UE to identify LCGs that can be scheduled by SPS, thereby using efficiently uplink SPS resource and improving quality of uplink services scheduling.

7 Claims, 4 Drawing Sheets

(51) Int. Cl.
| | |
|---|---|
| *H04W 16/02* | (2009.01) |
| *H04W 76/00* | (2009.01) |
| *H04W 76/02* | (2009.01) |
| *H04W 28/02* | (2009.01) |
| *H04W 72/12* | (2009.01) |
| *H04W 76/04* | (2009.01) |

(52) U.S. Cl.
CPC ...... *H04W28/0268* (2013.01); *H04W 72/1236* (2013.01); *H04W 76/00* (2013.01); *H04W 76/02* (2013.01); *H04W 76/046* (2013.01)

(56) References Cited

U.S. PATENT DOCUMENTS

| | | | | |
|---|---|---|---|---|
| 2013/0137469 | A1* | 5/2013 | Schmidt | H04W 74/006 455/466 |
| 2013/0235808 | A1* | 9/2013 | Earnshaw | H04L 1/0003 370/329 |
| 2014/0307674 | A1 | 10/2014 | Feuersaenger et al. | |

FOREIGN PATENT DOCUMENTS

| | | |
|---|---|---|
| CN | 102369778 A | 3/2012 |
| EP | 2237633 A1 | 10/2010 |

OTHER PUBLICATIONS

English Translation of the Written Opinion of the International Search Authority in international application No. PCT/CN2013/082229, mailed on Nov. 28, 2013.
3GPP TS 36.331 V11.0.0 Jun. 2012.
Supplementary European Search Report in European application No. 13833840.5, mailed on Aug. 21, 2015.
Radio bearer grouping for uplink scheduling, mailed on Feb. 5, 2008.
3GPP TS 36.300 V11.2.0 , Overall description, mailed on Jun. 27, 2012.
Medium Access Control(MAC) protocol specification, mailed on Mar. 15, 2012.
3GPP TS 36.331 V10.6.0, Radio Resource Control (RRC), Protocol specification, mailed on Jun. 2012.
Universal Mobile Telecommunications System (UMTS); LTE; Non-Access-Stratum (NAS); protocol for Evolved Packet System (EPS); Stage 3; (3GPP TS 24.301 version 10.7.0 Release 10); 3GPP IUMTS; LTE; NAS; EPS; Stage3, mailed on Jul. 31, 2012.
LTE; Evolved Universal Terrestrial Radio Access (E-UTRA); Medium Access Control (MAC) protocol specification (3GPP TS 36.321 version 10.5.0 Release 10); 3GPP LTE; E-UTRA; Medium Access Control (MAC) protocol specification, mailed on Mar. 31, 2012.

* cited by examiner

METHOD AND SYSTEM FOR ESTABLISHING BEARER SUPPORTING UPLINK SEMI-PERSISTENT SCHEDULING AND USER EQUIPMENT THEREOF

TECHNICAL FIELD

The present disclosure relates to the field of mobile communications, and in particular to a method and system for establishing a bearer supporting uplink Semi-Persistent Scheduling (SPS) and a User Equipment (UE) thereof.

BACKGROUND

A Long Term Evolution (LTE) system typically allocates scheduling resources by dynamic scheduling way, but control information needs to be set for each service transmission so as to allocate resources using dynamic scheduling, as users simultaneously accessing a same cell increase progressively, control information desired to implement dynamic scheduling, which needs to be transmitted in the LTE system, also increases progressively, thereby affecting severely communication performances over air interfaces of the LTE system.

Therefore, in order to solve the problem of progressively increasing control information, for voice/data services having a fixedly-sized data packet and an arrival time interval meeting a certain law, for example Voice over Internet Protocol (VoIP) services, resources are allocated using a Semi-Persistent Scheduling (SPS) way.

The SPS refers to a scheduling way in which an Evolved Node B (eNB) transmits in advance control information for SPS to a UE, then the control information is not desired to be transmitted any longer, the UE can transmit and receive air interface data periodically according to time-frequency resources in Downlink Control Information (DCI) and the control information transmitted from the eNB, in this way, the overheads of control information can be reduced to avoid influence of excessive control information on communication performances over air interfaces of the LTE system.

FIG. 1 shows hierarchical relations of protocol stacks for control planes among a UE, an eNB and an Evolved Packet Core (EPC) in an LTE system, as shown in FIG. 1, the UE includes a Non-Access Stratum (NAS) and an Access Stratum (AS), wherein the AS includes a Physical layer (PHY) entity, a Medium Access Control (MAC) entity, a Radio Link Control (RLC) entity, a Packet Data Convergence Protocol (PDCP) entity and a Radio Resource Control (RRC) entity; the eNB includes a PHY entity, an MAC entity, an RLC entity, a PDCP entity and an RRC entity corresponding to respective entities of the AS of the UE; and the EPC includes an NAS corresponding to the NAS of the UE.

FIG. 2 is a schematic diagram showing Logic Channels (LCs) and Logic Channel Groups (LCGs) between an MAC entity and an RLC entity of a UE. There are totally 11 LCs for transmitting uplink/downlink signaling and services between the MAC entity and the RLC entity, the 11 LCs are divided into 4 LCGs, each LCG can include 4 LCs at the most. The LC is identified by a Radio Bearer Identity (RBID), and each LC corresponds to one RBID. The MAC entity is used to schedule services allocated to logic channels by classifiers.

At present, establishing a bearer supporting uplink SPS includes: an Evolved Packet System (EPS) bearer is established between an NAS of a UE and an NAS of an EPC, logic channels and logic channel groups that support uplink SPS are established respectively between an MAC entity and an RLC entity of the UE and between an MAC entity and an RLC entity of an eNB, and a corresponding relationship between respective classifiers and respective logic channels supporting uplink SPS is established. In this way, the establishment of a bearer supporting uplink SPS is completed, and the classifiers are used to allocate the received uplink services to corresponding logic channels.

According to regulations of the LTE protocol, an RRC entity of a UE can only transmit EPS bearer activation request information to the NAS entity, but cannot be an MAC entity of an AS, then the MAC entity cannot acquire the Quality of Service Class Identifier (QCI) included in the EPS bearer activation request information. The QCI is used to identify uplink services suitable for SPS. This will result in problems that the MAC entity doesn't know which services of uplink services allocated to logic channels are adapted to be scheduled using SPS, then the MAC entity may schedule uplink service which is more fit for SPS scheduling, by using dynamic scheduling, thus quality of uplink service scheduling is affected and resources reserved by the eNB and EPC for uplink SPS are wasted.

SUMMARY

In view of the above, the present disclosure provides a method and system for establishing a bearer supporting uplink Semi-Persistent Scheduling (SPS) and a User Equipment (UE) thereof, which can schedule uplink services suitable for SPS using the SPS way, thereby ensuring quality of uplink service scheduling and using efficiently resources reserved by the eNB for uplink SPS.

To this end, the technical solutions of embodiments of the present disclosure are implemented as follows.

The embodiment of the present disclosure provides a method for establishing a bearer supporting uplink Semi-Persistent Scheduling (SPS), and the method includes:

a Radio Resource Control (RRC) entity of a User Equipment (UE) parses an RRC connection reconfiguration message transmitted from an Evolved NodeB (eNB) to obtain logic channel configuration information, Evolved Packet System (EPS) bearer activation request information and Radio Bearer Identifier (RBID) information, and transmits the logic channel configuration information to a Media Access Control (MAC) entity of the UE and transmits the EPS bearer activation request information and the RBID information to a Non-Access Stratum (NAS) of the UE, wherein the logic channel configuration information includes an RBID and LCG information;

The MAC entity of the UE establishes a Logic Channel (LC) and a Logic Channel Group (LCG) between itself and a Radio Link Control (RLC) entity according to the received logic channel configuration information, and establishes a mapping between the RBID and the LCG;

The NAS of the UE establishes an EPS bearer between itself and an NAS of an Evolved Packet Core network (EPC) according to the received EPS bearer activation request information, and establishes correspondences between classifiers and LCs; and parses a Quality of service Class Identifier (QCI) from the EPS bearer activation request information, establishes a mapping between the parsed QCI and the received RBID, and transmits the mapping to the MAC entity;

And the MAC entity establishes a mapping among the QCI, the RBID and the LCG according to the established mapping between the RBID and the LCG and to the mapping between the QCI and the RBID transmitted from the NAS.

In an embodiment, after the establishing an EPS bearer between the NAS of the UE and an NAS of an Evolved Packet Core network (EPC), the method may further include:

the NAS of the UE responds to the eNB with an uplink direct transfer message including an EPS bearer activation acceptance message.

In an embodiment, before the RRC entity of the UE parses the RRC connection reconfiguration message from the eNB, the method may further include:

the EPC reserves resources according to EPS bearer establishment request information transmitted from the UE via the eNB or initiated by itself, and transmits the EPS bearer activation request information to the eNB; and the eNB reserves resources according to the received EPS bearer activation request information, and transmits to the UE, the RRC connection reconfiguration message including the EPS bearer activation request information encapsulated therein.

The embodiment of the present disclosure provides a system for establishing a bearer supporting uplink Semi-Persistent Scheduling (SPS), and the system includes an Evolved Node B (eNB) and a User Equipment (UE) including a Radio Resource Control (RRC) entity, a Media Access Control (MAC) entity and a Non-Access Stratum (NAS), wherein the eNB is configured to transmit an RRC connection reconfiguration message to the UE;

wherein the RRC entity of the UE is configured to parse the RRC connection reconfiguration message transmitted from the eNB to obtain logic channel configuration information, Evolved Packet System (EPS) bearer activation request information and Radio Bearer Identifier (RBID) information, transmit the logic channel configuration information to the MAC entity of the UE, and transmit the EPS bearer activation request information and the RBID information to the NAS of the UE, wherein the logic channel configuration information includes an RBID and LCG information;

wherein the MAC entity of the UE is configured to establish a Logic Channel (LC) and a Logic Channel Group (LCG) between itself and a Radio Link Control (RLC) entity according to the received logic channel configuration information, and establish a mapping between the RBID and the LCG; and establish, according to the established mapping between the RBID and the LCG and to a mapping between a Quality of service Class Identifier (QCI) and the RBID transmitted from the NAS, a mapping among the QCI, the RBID and the LCG; and wherein the NAS of the UE is configured to establish an EPS bearer between itself and an NAS of an Evolved Packet Core network (EPC) according to the received EPS bearer activation request information, and establish correspondences between classifiers and LCs; and the NAS of the UE is further configured to parse the QCI and the RBID from the EPS bearer activation request information, establish the mapping between the parsed QCI and the received RBID, and transmit the mapping to the MAC entity.

In an embodiment, the system may further include an Evolved Packet Core network (EPC), wherein the EPC is configured to reserve resources according to EPS bearer establishment request information transmitted from the UE via the eNB or initiated by itself, and transmit the EPS bearer activation request information to the eNB; and wherein the eNB is further configured to reserve resources according to the received EPS bearer activation request information, and encapsulate the EPS bearer activation request information into the RRC connection reconfiguration message.

The embodiment of the present disclosure provides a User Equipment (UE), and the UE includes a Radio Resource Control (RRC) entity, a Media Access Control (MAC) entity and a Non-Access Stratum (NAS), wherein the RRC entity is configured to parse an RRC connection reconfiguration message transmitted from an Evolved Node B (eNB) to obtain logic channel configuration information, Evolved Packet System (EPS) bearer activation request information and Radio Bearer Identifier (RBID) information, transmit the logic channel configuration information to the MAC entity of the UE, and transmit the EPS bearer activation request information and the RBID information to the NAS of the UE, wherein the logic channel configuration information includes an RBID and LCG information;

wherein the MAC entity is configured to establish a Logic Channel (LC) and a Logic Channel Group (LCG) between itself and a Radio Link Control (RLC) entity according to the received logic channel configuration information, and establish a mapping between the RBID and the LCG; and the MAC entity is further configured to establish, according to the established mapping between the RBID and the LCG and to a mapping between a Quality of service Class Identifier (QCI) and the RBID transmitted from the NAS, a mapping among the QCI, the RBID and the LCG; and wherein the NAS is configured to establish an EPS bearer between itself and an NAS of an Evolved Packet Core network (EPC) according to the received EPS bearer activation request information, and establish correspondences between classifiers and LCs; and the NAS of the UE is further configured to parse the QCI from the EPS bearer activation request information, establish the mapping between the parsed QCI and received RBID, and transmit the mapping to the MAC entity.

In an embodiment, the NAS of the UE is configured to respond to the eNB with an uplink direct transfer message including an EPS bearer activation acceptance message.

It can be seen from above that the technical solutions according to the embodiment of the present disclosure include: a Radio Resource Control (RRC) entity of a User Equipment (UE) parses an RRC connection reconfiguration message from an Evolved NodeB (eNB) to obtain logic channel configuration information, Evolved Packet System (EPS) bearer activation request information and Radio Bearer Identifier (RBID) information, transmits the logic channel configuration information to a Media Access Control (MAC) entity of the UE and transmits the EPS bearer activation request information and the RBID information to a Non-Access Stratum (NAS) of the UE, wherein the logic channel configuration information includes an RBID and LCG information; the MAC entity of the UE establishes a Logic Channel (LC) and a Logic Channel Group (LCG) between itself and a Radio Link Control (RLC) entity according to the received logic channel configuration information, and establishes a mapping between the RBID and the LCG;the NAS of the UE establishes an EPS bearer between itself and an NAS of an Evolved Packet Core network (EPC) according to the received EPS bearer activation request information, and establishes correspondences between classifiers and LCs; and parses a Quality of service Class Identifier (QCI) from the EPS bearer activation request information, establishes a mapping between the parsed QCI and received RBID, and transmits the mapping to the MAC entity; and the MAC entity of the UE establishes a mapping among the QCI, the RBID and the LCG according to the established mapping between the RBID and the LCG and to the mapping between the QCI and the RBID transmitted from the NAS of the UE. In this way, the MAC entity can acquire the mapping among the QCI, the RBID and the LCG, thus can schedule uplink services suitable for SPS using the SPS way, thereby ensuring quality of uplink service scheduling and using efficiently resources reserved by the eNB for uplink SPS.

DETAILED DESCRIPTION

Figure 1:
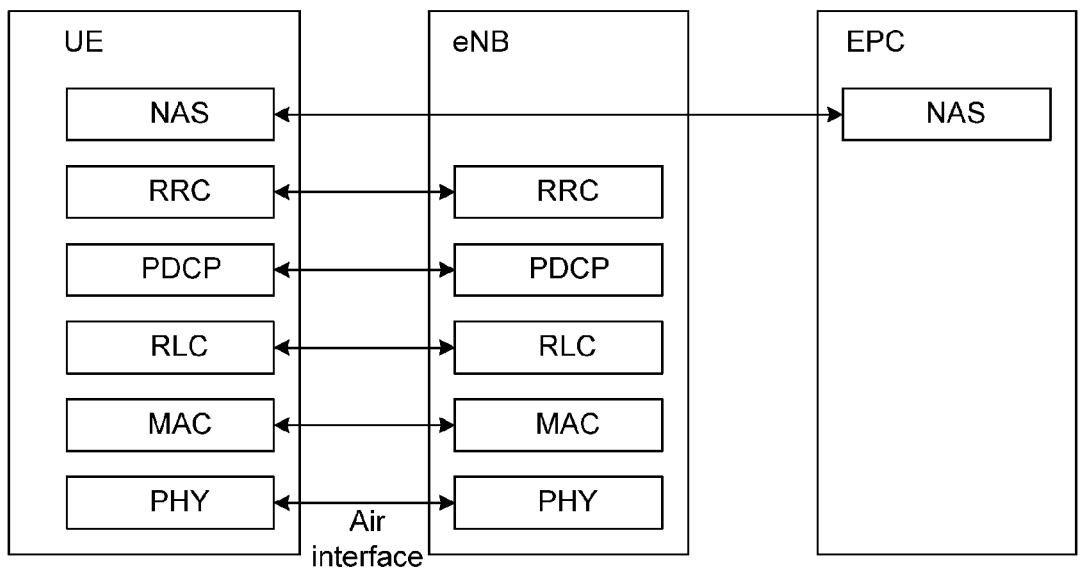
FIG. 1 shows hierarchical relations of protocol stacks for control planes between a UE, an eNB and an EPC in an LTE system.
Figure 2:
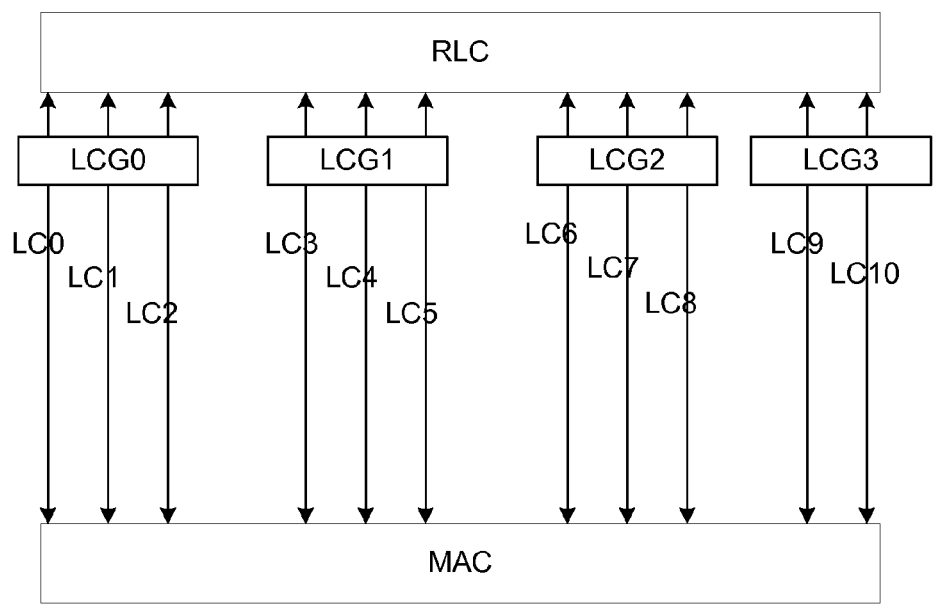
FIG. 2 is a schematic diagram showing LCs and LCGs between an MAC entity and an RLC entity of a UE.
Figure 3:
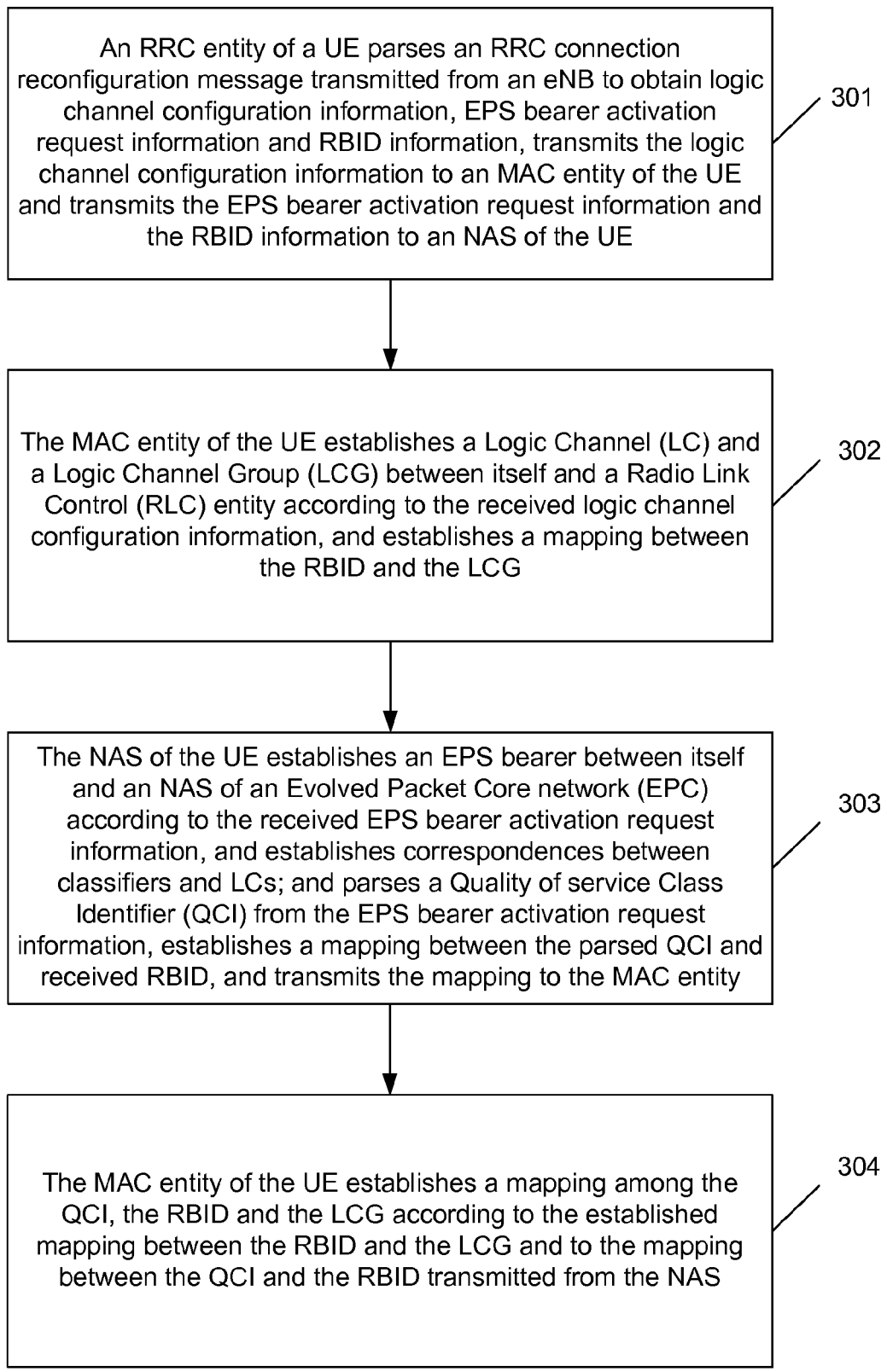
FIG. 3 is a flow chart of a method for establishing a bearer supporting uplink SPS according to a first embodiment of the present disclosure.

A first embodiment of the method for establishing a bearer supporting uplink SPS provided by the present disclosure is as shown in FIG. 3, and the method includes:

Step 301, an RRC entity of a UE parses an RRC connection reconfiguration message from an eNB to obtain logic channel configuration information, EPS bearer activation request information and RBID information, transmits the logic channel configuration information to an MAC entity of the UE and transmits the EPS bearer activation request information and the RBID information to an NAS of the UE, wherein the logic channel configuration information includes an RBID and LCG information;

step 302, the MAC entity of the UE establishes a Logic Channel (LC) and a Logic Channel Group (LCG) between itself and a Radio Link Control (RLC) entity according to the received logic channel configuration information, and establishes a mapping between the RBID and the LCG;

step 303, the NAS of the UE establishes an EPS bearer between itself and an NAS of an Evolved Packet Core network (EPC) according to the received EPS bearer activation request information, and establishes correspondences between classifiers and LCs; and parses a Quality of service Class Identifier (QCI) from the EPS bearer activation request information, establishes a mapping between the parsed QCI and received RBID, and transmits the mapping to the MAC entity; and step 304, the MAC entity of the UE establishes a mapping among the QCI, the RBID and the LCG according to the established mapping between the RBID and the LCG and to the mapping between the QCI and the RBID transmitted from the NAS of the UE.

Preferably, after the establishing an EPS bearer between the NAS of the UE and an NAS of an Evolved Packet Core network (EPC) in step 303, the method may further include:

the NAS of the UE responds to the eNB with an uplink direct transfer message including an EPS bearer activation acceptance message.

Preferably, before the RRC entity of the UE parses the RRC connection reconfiguration message from the eNB in step 301, the method may further include:

the EPC reserves resources according to EPS bearer establishment request information transmitted from the UE via the eNB or initiated by itself, and transmits the EPS bearer activation request information to the eNB; and the eNB reserves resources according to the received EPS bearer activation request information, and transmits to the UE, the RRC connection reconfiguration message including the EPS bearer activation request information encapsulated therein.

Figure 4:
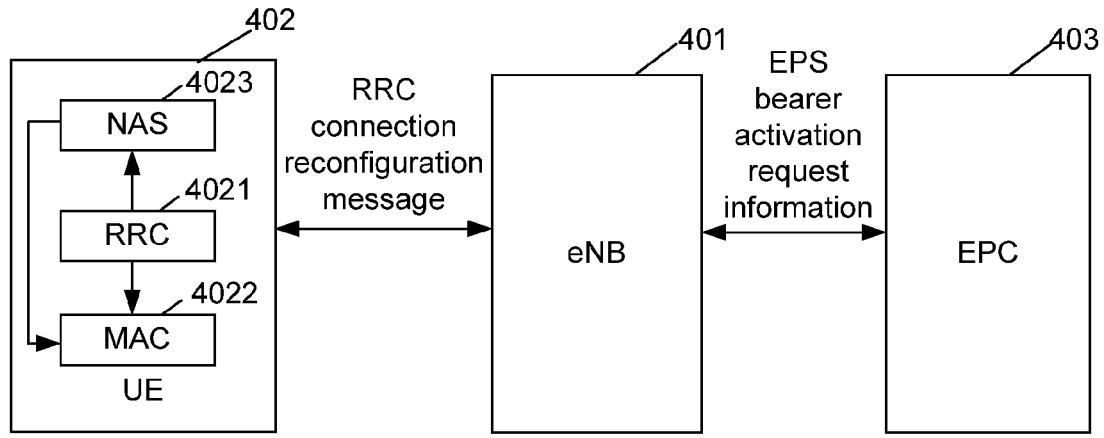
FIG. 4 is a schematic structural diagram of a system for establishing a bearer supporting uplink SPS according to an embodiment of the present disclosure.

An embodiment of the system for establishing a bearer supporting uplink SPS provided by the present disclosure is as shown in FIG. 4, and the system includes an eNB 401, a UE 402 including an RRC entity 4021, an MAC entity 4022 and an NAS 4023, specifically the eNB 401 is configured to transmit an RRC connection reconfiguration message to the UE 402;

the RRC entity 4021 of the UE 402 is configured to parse the RRC connection reconfiguration message from the eNB 401 to obtain logic channel configuration information, EPS bearer activation request information and RBID information, transmit the logic channel configuration information to the MAC entity 4022 of the UE 402, and transmit the EPS bearer activation request information and the RBID information to the NAS 4023 of the UE 402, wherein the logic channel configuration information includes an RBID and LCG information;

the MAC entity 4022 of the UE 402 is configured to establish an LC and an LCG between itself and an RLC entity according to the received logic channel configuration information, and establish a mapping between the RBID and the LCG; and establish, according to the established mapping between the RBID and the LCG and to a mapping between a QCI and the RBID transmitted from the NAS 4023, a mapping among the QCI, the RBID and the LCG; and the NAS 4023 of the UE 402 is configured to establish an EPS bearer between itself and an NAS of an EPC according to the received EPS bearer activation request information, and establish correspondences between classifiers and LCs; and the NAS 4023 of the UE 402 is further configured to parse the QCI from the EPS bearer activation request information, establish the mapping between the parsed QCI and received RBID, and transmit the mapping to the MAC entity 4022.

Preferably, the system may further include an EPC 403, and the EPC is configured to reserve resources according to EPS bearer establishment request information transmitted from the UE 402 via the eNB 401 or initiated by itself, and transmit the EPS bearer activation request information to the eNB 401; and accordingly the eNB 401 is further configured to reserve resources according to the received EPS bearer activation request information, and encapsulate the EPS bearer activation request information into the RRC connection reconfiguration message.

Figure 5:
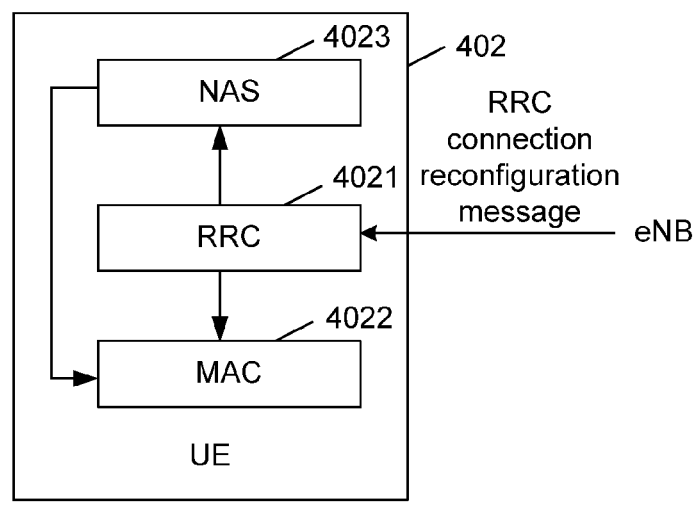
FIG. 5 is a schematic structural diagram of an UE according to an embodiment of the present disclosure.

A UE provided by an embodiment of the present disclosure is as shown in FIG. 5, and the UE 402 includes an RRC entity 4021, an MAC entity 4022 and an NAS 4023, specifically, the RRC entity 4021 is configured to parse the RRC connection reconfiguration message from an eNB to obtain logic channel configuration information, EPS bearer activation request information and RBID information, transmit the logic channel configuration information to the MAC entity 4022 of the UE 402, and transmit the EPS bearer activation request information and the RBID information to the NAS 4023 of the UE 402, wherein the logic channel configuration information includes an RBID and LCG information;

the MAC entity 4022 is configured to establish an LC and an LCG between itself and an RLC entity according to the received logic channel configuration information, and establish a mapping between the RBID and the LCG; and establish, according to the established mapping between the RBID and the LCG and to a mapping between a QCI and the RBID transmitted from the NAS 4023, a mapping among the QCI, the RBID and the LCG; and the NAS 4023 is configured to establish an EPS bearer between itself and an NAS of an EPC according to the received EPS bearer activation request information, and establish correspondences between classifiers and LCs; and the NAS 4023 is further configured to parse the QCI from the EPS bearer activation request information, establish the mapping between the parsed QCI and received RBID, and transmit the mapping to the MAC entity 4022.

Preferably, the NAS 4023 may be further configured to respond to the eNB with an uplink direct transfer message including an EPS bearer activation acceptance message.

Figure 6:
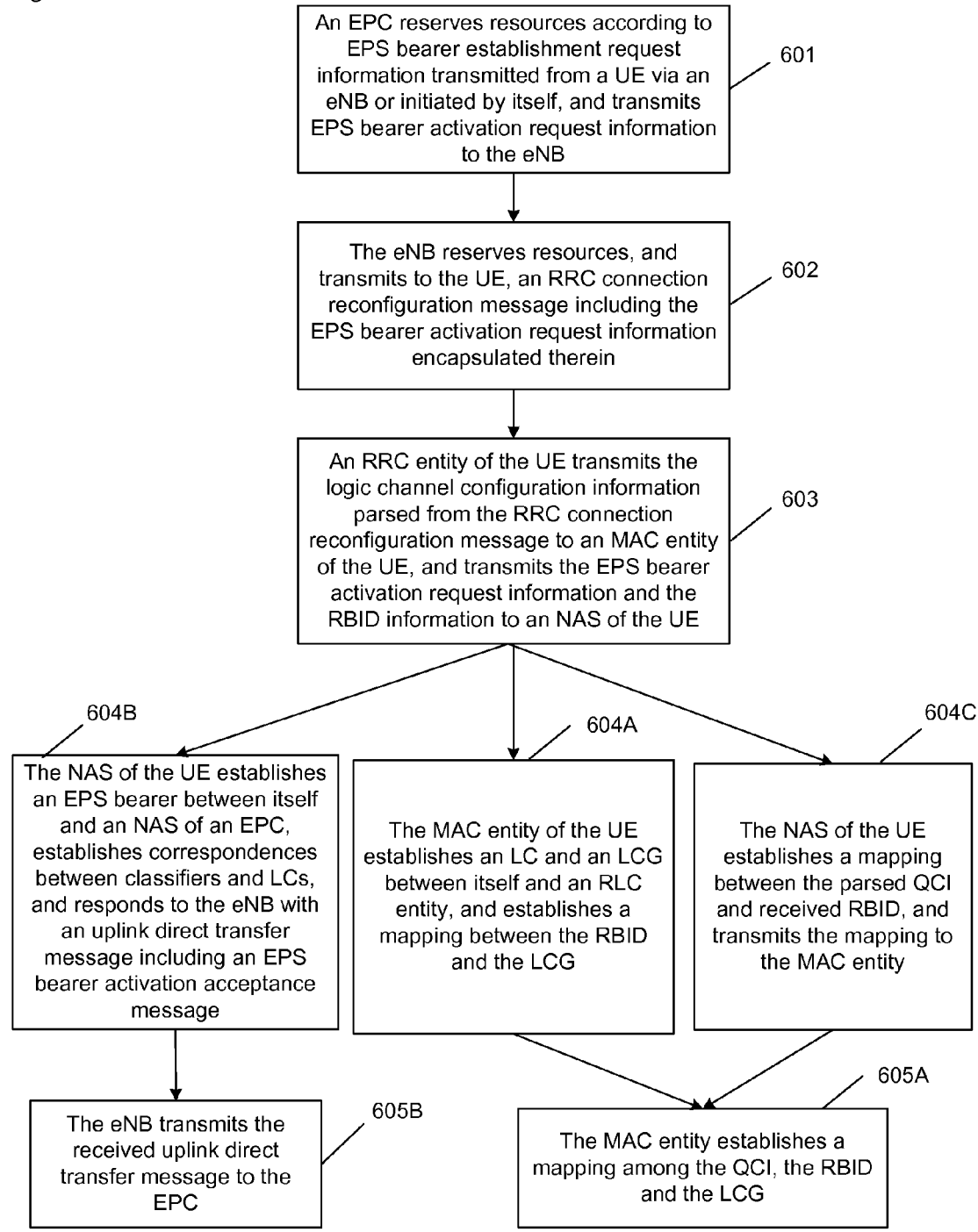
FIG. 6 is a flow chart of a method for establishing a bearer supporting uplink SPS according to a second embodiment of the present disclosure.

A second embodiment of the method for establishing a bearer supporting uplink SPS provided by the present disclosure is as shown in FIG. 6, and the method includes:

step 601, an EPC reserves resources according to EPS bearer establishment request information transmitted from a UE via an eNB or initiated by itself, and transmits EPS bearer activation request information to the eNB.

Step 602, the eNB reserves resources according to the received EPS bearer activation request information, and transmits to the UE, an RRC connection reconfiguration message including the EPS bearer activation request information encapsulated therein.

Step 603, an RRC entity of the UE parses the RRC connection reconfiguration message from the eNB to obtain logic channel configuration information, EPS bearer activation request information and RBID information, transmits the logic channel configuration information to an MAC entity of the UE and transmits the EPS bearer activation request information and the RBID information to an NAS of the UE, wherein the logic channel configuration information includes an RBID and LCG information.

Step 604A, the MAC entity of the UE establishes an LC and an LCG between itself and an RLC entity according to the received logic channel configuration information, and establishes a mapping between the RBID and the LCG.

Step 604B, the NAS of the UE establishes an EPS bearer between itself and an NAS of an EPC according to the received EPS bearer activation request information, establishes correspondences between classifiers and LCs, and responds to the eNB with an uplink direct transfer message including an EPS bearer activation acceptance message.

Step 604C, the NAS of the UE parses an QCI form the EPS bearer activation request information, establishes a mapping between the parsed QCI and received RBID, and transmits the mapping to the MAC entity.

Step 605A, the MAC entity establishes a mapping among the QCI, the RBID and the LCG according to the established mapping between the RBID and the LCG and to the mapping between the QCI and the RBID transmitted from the NAS of the UE.

Step 605B, the eNB transmits the received uplink direct transfer message to the EPC.

To sum up, by means of the method for establishing a bearer supporting uplink SPS, the MAC entity can acquire the mapping among the QCI, the RBID and the LCG, thus can schedule uplink services suitable for SPS using the SPS way, thereby ensuring quality of uplink service scheduling and using efficiently resources reserved by the eNB for uplink SPS.

What described are merely preferable embodiments of the present disclosure, and are not intended to limit the present disclosure.

The invention claimed is:

1. A method for establishing a bearer supporting uplink Semi-Persistent Scheduling (SPS), comprising:
    parsing, by a Radio Resource Control (RRC) entity of a User Equipment (UE), an RRC connection reconfiguration message transmitted from an Evolved Node B (eNB) to obtain logic channel configuration information and Evolved Packet System (EPS) bearer activation request information, parsing the logic channel configuration information to obtain Radio Bearer Identifier (RBID) information and Logic Channel Group (LCG) information, transmitting the parsed logic channel configuration information to a Media Access Control (MAC) entity of the UE and transmitting the EPS bearer activation request information and the RBID information to a Non-Access Stratum (NAS) of the UE;
    establishing, by the MAC entity of the UE, a Logic Channel (LC) and a Logic Channel Group (LCG) between itself and a Radio Link Control (RLC) entity according to the received logic channel configuration information, and establishing a mapping between the RBID and the LCG;
    establishing, by the NAS of the UE, an EPS bearer between itself and an NAS of an Evolved Packet Core network (EPC) according to the received EPS bearer activation request information, and establishing correspondences between classifiers and LCs; parsing a Quality of service Class Identifier (QCI) from the EPS bearer activation request information, establishing a mapping between the parsed QCI and the received RBID, and transmitting the mapping to the MAC entity; and
    establishing, by the MAC entity, a mapping among the QCI, the RBID and the LCG according to the established mapping between the RBID and the LCG and to the mapping between the QCI and the RBID transmitted from the NAS.

2. The method according to claim 1, after the step of establishing an EPS bearer between the NAS of the UE and an NAS of an EPC, the method further comprising:
    responding, by the NAS of the UE, to the eNB with an uplink direct transfer message including an EPS bearer activation acceptance message.

3. The method according to claim 1, before the step of parsing, by an RRC entity of a UE, an RRC connection reconfiguration message transmitted from an eNB, the method further comprising:
    reserving, by the EPC, resources according to EPS bearer establishment request information transmitted from the UE via the eNB or initiated by itself, and transmitting the EPS bearer activation request information to the eNB; and
    reserving, by the eNB, resources according to the received EPS bearer activation request information, and transmitting, to the UE, the RRC connection reconfiguration message including the EPS bearer activation request information encapsulated therein.

4. A system for establishing a bearer supporting uplink Semi-Persistent Scheduling (SPS), the system comprising an Evolved Node B (eNB) and a User Equipment (UE) including a Radio Resource Control (RRC) entity, a Media Access Control (MAC) entity and a Non--Access Stratum (NAS),
    wherein the eNB is configured to transmit an RRC connection reconfiguration message to the UE;
    wherein the RRC entity of the UE is configured to parse the RRC connection reconfiguration message transmitted from the eNB to obtain logic channel configuration information, and Evolved Packet System (EPS) bearer activation request information parse the logic channel configuration information to obtain Radio Bearer Identifier (RBID) information and Logic Channel Group (LCG) information, transmit the parsed logic channel configuration information to the MAC entity of the UE, and transmit the EPS bearer activation request information and the RBID information to the NAS of the UE;

wherein the MAC entity of the UE is configured to establish a Logic Channel (LC) and a Logic Channel Group (LCG) between itself and a Radio Link Control (RLC) entity according to the received logic channel configuration information, and establish a mapping between the RBID and the LCG; and establish, according to the established mapping between the RBID and the LCG and to a mapping between a Quality of service Class Identifier (QCI) and the RBID transmitted from the NAS, a mapping among the QCI, the RBID and the LCG; and wherein the NAS of the UE is configured to establish an EPS bearer between itself and an NAS of an Evolved Packet Core network (EPC) according to the received EPS bearer activation request information, and establish correspondences between classifiers and LCs; and the NAS of the UE is further configured to parse the QCI and the RBID from the EPS bearer activation request information, establish the mapping between the parsed QCI and the received RBID, and transmit the mapping to the MAC entity.

5. The system according to claim 4, further comprising an Evolved Packet Core network (EPC), wherein the EPC is configured to reserve resources according to EPS bearer establishment request information transmitted from the UE via the eNB or initiated by itself, and transmit the EPS bearer activation request information to the eNB; and wherein the eNB is further configured to reserve resources according to the received EPS bearer activation request information, and encapsulate the EPS bearer activation request information into the RRC connection reconfiguration message.

6. A User Equipment (UE) comprising a Radio Resource Control (RRC) entity, a Media Access Control (MAC) entity and a Non-Access Stratum (NAS), wherein the RRC entity is configured to parse an RRC connection reconfiguration message transmitted from an Evolved Node B (eNB) to obtain logic channel configuration information, Evolved Packet System (EPS) bearer activation request information, parse logic channel configuration information to obtain Radio Bearer Identifier (RBID) information and Logic Channel Group (LCG) information, transmit the parsed logic channel configuration information to the MAC entity of the UE, and transmit the EPS bearer activation request information and the RBID information to the NAS of the UE;

wherein the MAC entity is configured to establish a Logic Channel (LC) and a Logic Channel Group (LCG) between itself and a Radio Link Control (RLC) entity according to the received logic channel configuration information, and establish a mapping between the RBID and the LCG; and the MAC entity is further configured to establish, according to the established mapping between the RBID and the LCG and to a mapping between a Quality of service Class Identifier (QCI) and the RBID transmitted from the NAS, a mapping among the QCI, the RBID and the LCG; and wherein the NAS is configured to establish an EPS bearer between itself and an NAS of an Evolved Packet Core network (EPC) according to the received EPS bearer activation request information, and establish correspondences between classifiers and LCs; and the NAS of the UE is further configured to parse the QCI from the EPS bearer activation request information, establish the mapping between the parsed QCI and received RBID, and transmit the mapping to the MAC entity.

7. The UE according to claim 6, wherein the NAS is further configured to respond to the eNB with an uplink direct transfer message including an EPS bearer activation acceptance message.

* * * * *